(12) United States Patent
Qiu et al.

(10) Patent No.: US 8,782,207 B2
(45) Date of Patent: Jul. 15, 2014

(54) SYSTEM AND METHOD TO PREVENT ENDPOINT DEVICE RECOVERY FLOOD IN NGN

(75) Inventors: Chaoxin Qiu, Austin, TX (US); James E. Jackson, Austin, TX (US); Mehrad Yasrebi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 790 days.

(21) Appl. No.: 12/589,209

(22) Filed: Oct. 20, 2009

(65) Prior Publication Data

US 2011/0093584 A1    Apr. 21, 2011

(51) Int. Cl.
*G06F 15/16*     (2006.01)
*G06F 15/173*    (2006.01)
*G06F 9/46*      (2006.01)

(52) U.S. Cl.
USPC .......... 709/224; 709/203; 709/226; 709/229; 709/230; 709/245; 718/105

(58) Field of Classification Search
None
See application file for complete search history.

(56) References Cited

U.S. PATENT DOCUMENTS

| | | | |
|---|---|---|---|
| 6,178,160 B1* | 1/2001 | Bolton et al. ................. | 370/255 |
| 8,261,351 B1* | 9/2012 | Thornewell et al. ............ | 726/23 |
| 2004/0267897 A1* | 12/2004 | Hill et al. ...................... | 709/217 |
| 2006/0136421 A1* | 6/2006 | Muthukrishnan et al. ...... | 707/10 |
| 2008/0052628 A1* | 2/2008 | Bugenhagen et al. ......... | 715/736 |
| 2009/0222583 A1* | 9/2009 | Josefsberg et al. ........... | 709/245 |
| 2010/0220587 A1* | 9/2010 | Kovacs et al. ................. | 370/230 |

* cited by examiner

*Primary Examiner* — Ranodhi Serrao
*Assistant Examiner* — Farrukh Hussain

(57) ABSTRACT

A mechanism is provided for recovering from a catastrophic failure that results in a large number of user endpoints attempting to come on line simultaneously after an NGN is restored. In an enhanced DNS load balancer, DNS queries from the user end points relating to a particular NGN edge device are selectively dropped if a rate of queries for the particular edge device suddenly increases or exceeds a threshold. The query dropping may also be based in part on the class of service assigned to the user endpoint.

21 Claims, 3 Drawing Sheets

SYSTEM AND METHOD TO PREVENT ENDPOINT DEVICE RECOVERY FLOOD IN NGN

FIELD OF THE DISCLOSURE

The present invention relates generally to Next Generation Networks (NGNs). More particularly, the present application relates to methods and systems for recovering from a catastrophic failure that results in a large number of endpoints attempting to come on line simultaneously after the NGN is restored.

BACKGROUND

A large scale NGN typically includes three tiers. In the first tier, user end point devices (UEs) are used by subscribers across the network. The second tier comprises NGN edge devices that provide the public interfaces for connecting UEs; for example, Proxy/Call Session Control Function (P-CSCF) defined by $3^{rd}$ Generation Partnership Project (3GPP) Internet Protocol Multimedia Subsystem (IMS), or Session Border Controller defined by the Telcoms and Internet Converged Services and Protocols for Advanced Networks (TISPAN) NGN standards. Finally, tier 3 is the NGN core that includes other call processing network elements that are deployed behind the edge devices; for example, the core may include Interrogating/CSCF (I-CSCF), Serving/CSCF (S-CSCF), Home Subscribers Service (HSS), Media Gateway Control Function (MGCF), and various application servers, etc.

The user endpoint devices of an NGN are typically configured to access a set of primary edge devices based on physical locations of the UEs, or on the rate centers of UE's phone numbers. The UEs are also capable of accessing a different set of secondary edge devices if the primary edge devices cannot be reached.

An NGN requires all UEs to be authenticated and authorized when they first connect to the network. In NGNs based on the 3GPP IMS standard, for example, UEs must REGISTER to the NGN via an edge device and the NGN will use a Hypertext Transport Protocol (HTTP) digest authentication method to authenticate and authorize the services for each UE. After a UE has successfully registered with the network, the UE is required to re-register with the network periodically. The NGN will typically not re-authenticate the UE for every re-registration and may re-authenticate at a less frequent interval. Therefore, initial registrations by UEs typically require a lot more network processing resources than re-registrations.

In some large scale outage scenarios such as power outages, cable cuts, or certain Internet Service Provider (ISP) failures, a large number of UEs can be disconnected from an NGN for a sustained period of time and, thus, their original registrations expire. When the outage problem is fixed, the large number of UEs starts to re-connect to their primary NGN edge devices, which results in a large number of initial registrations in a very short time period. This situation is typically referred to as a "recovery storm" or as a "registration flood." A recovery storm can overwhelm the NGN edge devices in the area and cause a serious interruption within the NGN network that has to process a large number of initial registrations with full Authentication, Authorization and Accounting (AAA) processes in a short time window.

Some methods have been suggested to prevent registration floods. For example, Session Initiation Protocol (SIP)-aware intrusion detection and prevention devices may be deployed in front of the NGN edge devices. Those intrusion detection and prevention devices may be configured to reject excessive SIP requests, including SIP registration requests, when the number of those requests exceeds a certain threshold. In another example, some session controller products can be configured to accept only a certain number of initial registration requests per second.

In each of those solutions, however, the UEs remain able to resolve the IP addresses of the target NGN edge devices, and can therefore send excessive numbers of registration requests to the NGN edge devices. There therefore remains a need for a method and system capable of quickly and automatically reinstating a Voice over Internet Protocol (VoIP) communications system after a catastrophic failure. The technique should re-register user endpoints as quickly as possible while avoiding NGN recovery storms.

SUMMARY

The present invention addresses the needs described above by providing, in one embodiment, a method for registering user endpoint devices via a network edge device in an NGN. At a Domain Name System (DNS) load balancer, a rate of DNS queries for an address of a target network edge device in the NGN is monitored. A flow of DNS queries for the address of the target network edge device is received from the user endpoint devices for use in registering in the NGN.

If the rate of DNS queries is below a threshold rate for the target network edge device, then the flow of DNS queries is forwarded to a DNS server. If the rate of DNS queries is above the threshold rate for the target network edge device, then the flow of DNS queries is throttled.

The queries may be throttled in several ways. For example, if the rate exceeds a first threshold, then a predetermined percentage of the queries may be dropped, and if the rate exceeds a second threshold higher than the first threshold, then all queries may be dropped until the rate falls to a predetermined level.

At the DNS server, the DNS queries are received from the DNS load balancer and the address of the target network edge device is resolved. Responses to the DNS queries are transmitted through the DNS load balancer to the user edge device. The responses may include an IP address of the target network edge device.

The method may also include deriving the threshold rate for the target network edge device from at least one of the following parameters: a number of user endpoint devices associated with the target network edge device; a historic arrival rate of initial DNS queries from user endpoint devices; and a maximum arrival rate capacity of the target network edge device.

The method may be applied to registering for a VoIP service.

Another embodiment is a method for registering user endpoint devices via a network edge device in an NGN. At a DNS load balancer, a rate of DNS queries for an address of a target network edge device in the NGN is monitored. A flow of DNS queries is received from the user endpoint devices. The DNS queries are for the address of the target network edge device for use in registering in the NGN.

For each user endpoint device of the flow, a class of service is determined. If the rate of DNS queries is above a threshold rate for the target network edge device, then a portion of the flow comprising only those DNS queries from user endpoint devices having a class of service below a predetermined class of service is throttled.

DESCRIPTION

Figure 1:
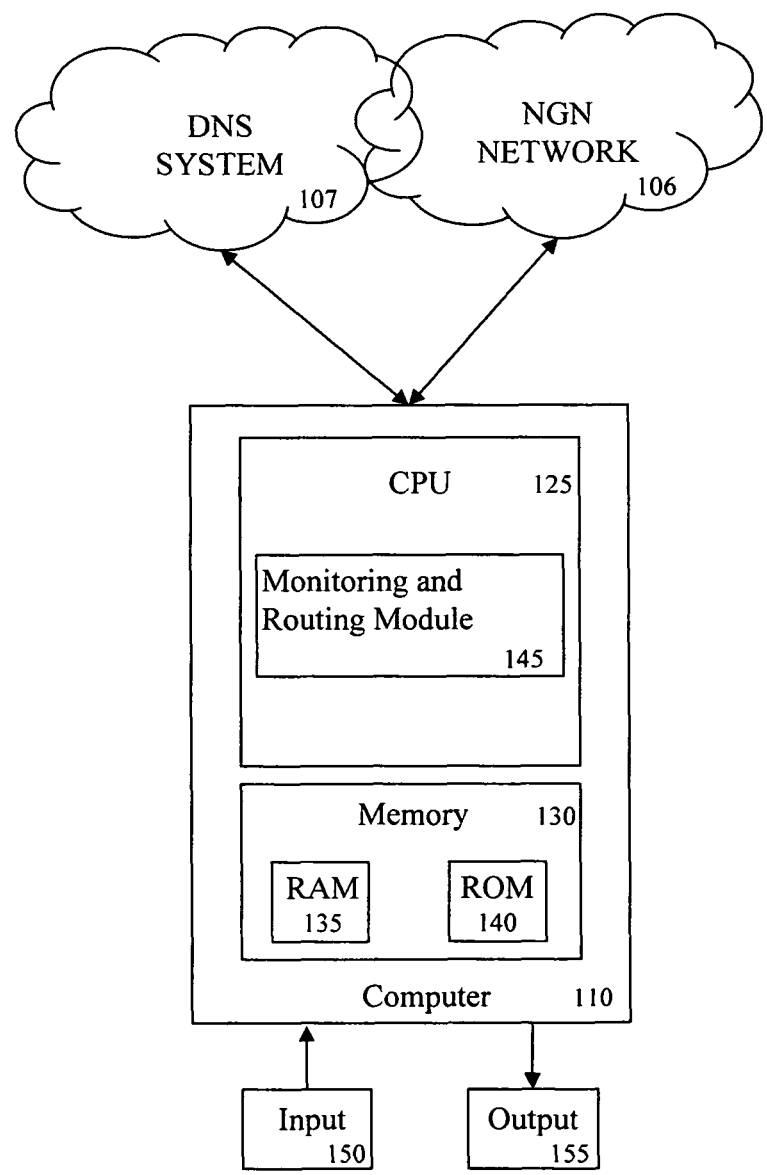
FIG. 1 is a schematic block diagram of a system in accordance with the present disclosure.

The presently described system for registering user endpoint devices may be included as part of a DNS system, as part of an NGN system, or as a stand-alone system. Portions of the system may also reside in more than one place. FIG. 1 illustrates a system 100 for registering user endpoint devices according to an exemplary embodiment of the present invention. As shown in FIG. 1, the system 100 includes a computer 110. The computer 110 may be connected to a DNS system 107 and to a NGN network 106 as shown, or may reside within one or both of those networks.

The computer 110, which may be a portable or laptop computer or a mainframe or other computer configuration, includes a central processing unit (CPU) 125 and a memory 130 connected to an input device 150 and an output device 155. The CPU 125 includes a monitoring and routing software module 145 configured to perform one or more methods as discussed herein. Although shown inside the CPU 125, the module 145 can be located outside the CPU 125.

The memory 130 includes a random access memory (RAM) 135 and a read-only memory (ROM) 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The program may reside on the ROM 140 or on any other computer-usable medium as computer readable instructions stored thereon for execution by the CPU 125 or other processor to perform the methods of the invention. The ROM 140 may also contain data for use by the programs, such as routing data.

The input 150 may be a keyboard, mouse, network interface, etc., and the output 155 may be a liquid crystal display (LCD), cathode ray tube (CRT) display, printer, etc.

The computer 110 can be configured to operate and display information by using, e.g., the input 150 and output 155 devices to execute certain tasks. Program inputs, such as training data, etc., may be input through the input 150, may be stored in memory 130, or may be received as live data from the DNS system 107 and NGN network 106.

The present disclosure describes a mechanism for controlling recovery storms or registration floods, that may result when a large number of endpoints in an NGN network come online simultaneously after a catastrophic failure. The catastrophic failure may, for example, be a wide-scale power outage, cable cut, or any failure that causes a large number of user endpoints to be dropped and that results in those endpoint attempting to come on line nearly simultaneously. The mechanism described herein utilizes the DNS infrastructure to efficiently control the recovery storm condition.

Figure 2:
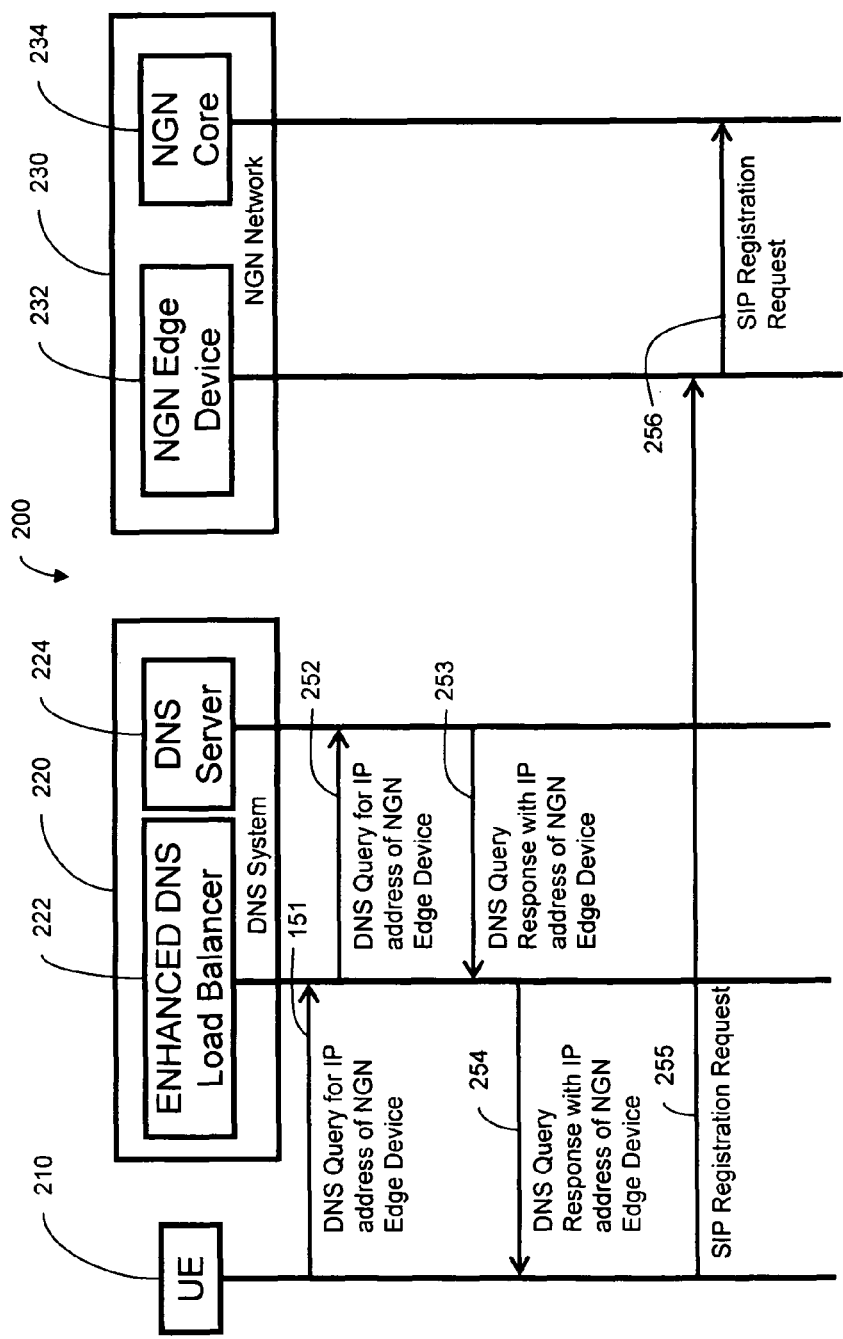
FIG. 2 is a sequence diagram showing the registration procedure of a user endpoint with a registrar in the NGN core.

A message sequence in a procedure for registering a UE 210 in an NGN network 230 is shown in the sequence diagram 200 of FIG. 2. The message sequence as shown is performed by the disclosed system under normal load conditions. The UEs are provided with the IP addresses of one or more DNS load balancers and the domain names of one or more NGN edge devices.

The UEs query the DNS server (through the load balancer) to resolve the IP addresses of target NGN edge devices before the UEs register with NGN via an edge device. The UE 210 initiates the procedure by sending a DNS query 251 to the IP address of an enhanced DNS load balancer 222 in a DNS system 220. The query 251 is for resolution of a domain name that represents an NGN edge access interface, and requests an IP address for the NGN edge device interface. From the point of view of the DNS load balancer, DNS queries requesting an IP address of the same NGN edge device interface may be considered a "flow" of queries for that NGN edge device interface. Queries in a particular "flow" may be interspersed with queries for other NGN edge device interfaces.

Under normal circumstances, the enhanced DNS load balancer 222 forwards the query at 252 to a DNS server 224 in the DNS system 220. The DNS server 224 resolves the IP address of the NGN edge device and returns a DNS query response 253 to the DNS load balancer 222. The DNS query response 253 contains the IP address of the NGN edge device. The DNS load balancer 222 forwards the DNS query response at 254 to the UE.

The UE now has all the information it needs to send a SIP registration request to the NGN network. The UE transmits that request at 255 to the NGN edge device 232 in the NGN network 230. The NGN edge device 232 forwards the request at 256 to a registrar in the NGN core 234.

The UEs also periodically re-query the DNS server based on a time-to-live (TTL) value contained in the DNS records. The UEs continue to re-query the DNS server if DNS queries result in error or no-response.

As noted above, the disclosed system includes an enhanced load balancer 222 in the DNS infrastructure 220 that is used for the NGN network. The enhanced load balancer monitors the DNS queries 251 from the NGN user endpoint devices 210 to look for any sudden burst of queries for any NGN edge device domain name. When detecting a sudden burst of queries for one or more NGN edge device domain names, the load balancer starts to throttle the queries containing those domain names by dropping all or a certain percentage of the queries.

A determination that a sudden burst of queries is occurring may be made by comparing the query rate for a particular NGN edge device with a threshold rate. The threshold is selected based on the capability of a particular NGN edge device to process registration requests, among other things. Threshold rates for different NGN edge devices may therefore be different, depending on the capacities of the NGN edge devices. DNS queries arriving at a particular load balancer may therefore be treated differently based on query rates and thresholds for the particular NGN edge devices for which the queries are made.

DNS load balancers are known to provide overload protection for the DNS servers behind them. Threshold rates used in providing that protection are based on the overall capacity of the protected DNS server, among other considerations. Threshold rates used in the present disclosure to control recovery storms are typically much lower than any threshold rate used by the load balancer in providing overload protection for a DNS server.

Figure 3:
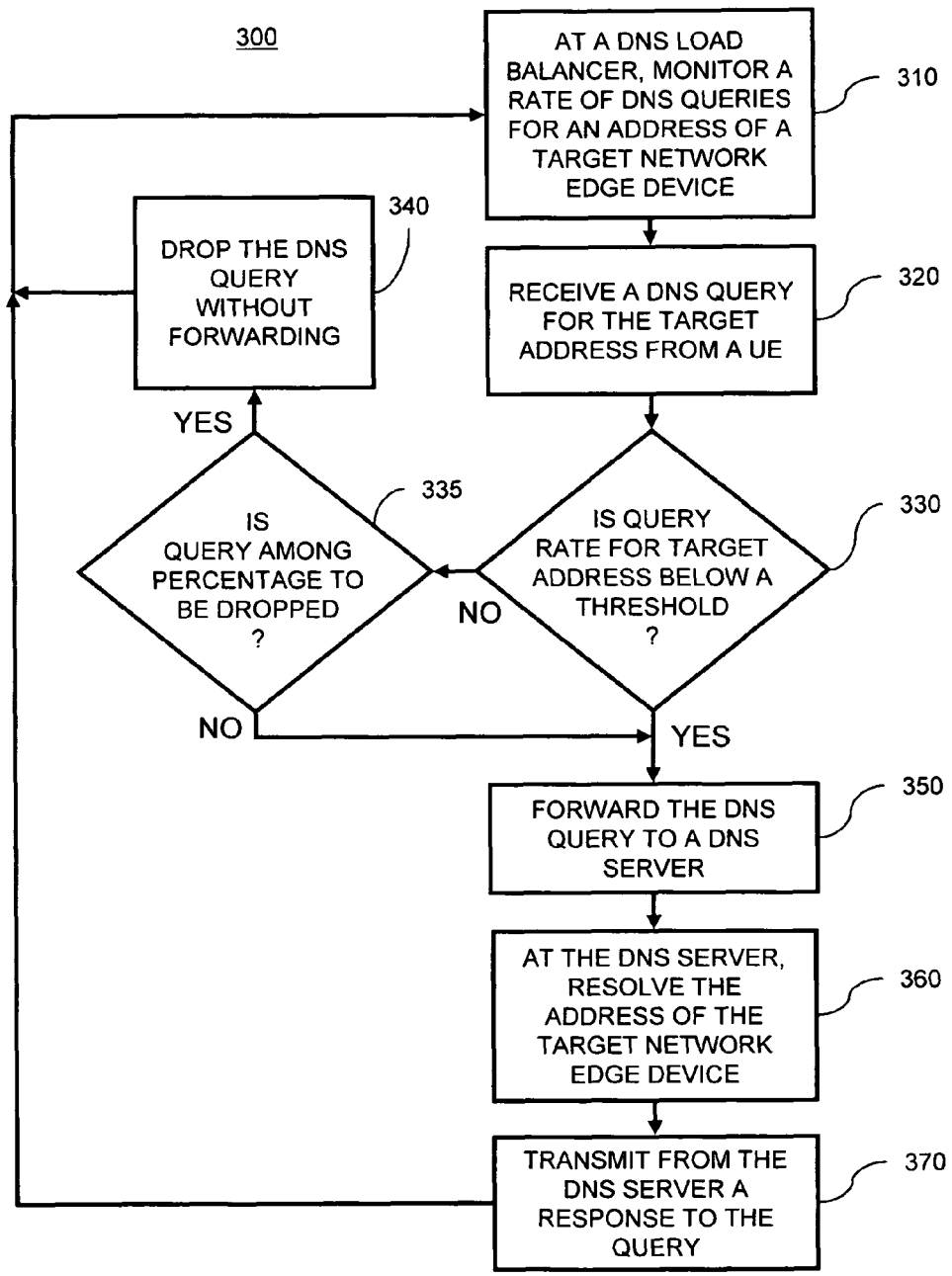
FIG. 3 is a flow chart showing a method as described in the present disclosure.

A generalized method in accordance with the present disclosure is represented by the flow chart 300 of FIG. 3. The method starts at step 310, wherein, at the enhanced DNS load balancer, the DNS query flow is monitored. The flow of queries for each of the NGN edge devices is tracked separately by the load balancer. When a DNS query is received from a UE for a particular NGN edge device at 320, the load balancer determines at 330 whether the DNS query flow for that particular NGN edge device has exhibited a sudden, dramatic increase. In the embodiment shown in chart 300, the query rate is compared to a threshold.

If a sudden increase in DNS query traffic flow is detected at 330 for a particular NGN edge device, then queries from the UEs pertaining to that edge device are throttled. In the embodiment shown, the queries are throttled by dropping all or a certain percentage of those queries. It is determined at 335 whether the subject query is among those to be dropped, and, if so, the query is dropped at 340. When a query is dropped by the DNS load balancer, the domain name representing the target NGN edge access interface is never resolved, and no SIP registration request is therefore ever sent to the NGN edge device. SIP registration traffic to the target NGN edge device is thereby selectively reduced. That is done independently of any DNS server overload protection performed by the DNS load balancer, and is generally done at a query rate far below rates that would trigger such overload protection.

If no burst of DNS queries is detected, or if the query rate for the particular NGN edge device remains below the threshold, then the query is forwarded by the DNS load balancer to the DNS server at 350. The DNS server resolves the address at 360 and transmits a response to the DNS query back to the DNS load balancer at 370.

This simple design cost-effectively protects an NGN from being overwhelmed by a flood of legitimate service requests from a large number of UEs that simultaneously recover from a service interruption. By detecting and throttling at the load balancers of the DNS system, it prevents both the NGN DNS infrastructure and the NGN service infrastructure from being overloaded.

The method places the line of defense at an early entry point in the formation of a "recovery storm." By throttling at the load balancers in front of the DNS servers, the UEs are not able to resolve the IP addresses of the target NGN edge devices. As such, the UEs are not able to send excessive registration requests to NGN edge devices, and, since the load balancers throttle the incoming DNS queries, the DNS servers are also protected from DNS query floods.

The present disclosure enhances the DNS load balancer by establishing thresholds representing maximum number of DNS queries per second per NGN edge device that can be passed through to DNS servers. The thresholds may be different between edge devices based on the designed capacity of each edge device. The thresholds may be derived from the number of UEs that normally register with each edge device, the normal arrival rate of initial registration requests, and the maximum arrival rate of initial registration request the edge device can handle.

The DNS load balancer is further enhanced with additional logic that 1) monitors the DNS query arrival rate per NGN edge device; 2) detects if the DNS query arrival rate has exceeded the maximum threshold; and 3) if the DNS query arrival rate exceeds the maximal threshold, drops excess DNS queries. In addition to or as an alternative to the thresholds, the enhanced load balancer may incorporate statistical or other techniques to better detect or predict query floods.

In another example embodiment, intelligence is provided for considering the class of service when throttling must be enforced. UEs in a NGN may be grouped into different networks (e.g., by assigning different IP addresses from different sub-networks) based on their classes of service. For example, UEs from hospitals and gold members can be grouped into their corresponding sub-networks. UEs may be grouped into discrete classes such as "low" and "high." The enhanced DNS load balancer may be further configured with additional guidelines wherein a sub-net of UEs are given priority when throttling must be enforced.

In one example implementation, the enhanced load balancer will begin blocking DNS queries from subnets that have been labeled with low class of service (COS) tags when the DNS query arrival rate reaches 80% of the maximum threshold for an NGN edge device. The load balancer will block all excessive DNS queries after the query arrival rate exceeds the maximum threshold.

The present disclosure provides simple, yet cost-effective methods to automatically prevent a recovery storm in an NGN network, which may be caused by wide-area faults, such as power outage, cable cut, etc. The method prevents the recovering UEs from flooding the DNS system and the NGN network by throttling at the load balancers in front of DNS servers.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. The described embodiments are merely illustrative of the principles of the present invention and various modifications may be implemented by those skilled in the art without departing from the scope and spirit of the invention.

What is claimed is:

1. A method for registering user endpoint devices via a network edge device in a next generation network, the method comprising:
    at a domain name system load balancer, protecting a domain name system server by limiting to a first threshold rate an overall query rate of domain name system queries sent to the domain name system server;
    at the domain name system load balancer, monitoring a rate of domain name system queries for resolving a domain name of a particular target network edge device in the next generation network;
    receiving from the user endpoint devices a flow of domain name system queries, each query of the flow being for resolving the domain name of the same particular target network edge device for use in registering in the next generation network;
    if the rate of domain name system queries for resolving the domain name of the particular target network edge device is below a second threshold rate lower than the first threshold rate, then forwarding the flow of domain name system queries to the domain name system server;
    if the rate of domain name system queries is above the second threshold rate for the target network edge device, then throttling the flow of domain name system queries.

2. The method of claim 1, wherein throttling the flow of domain name system queries comprises:
    if the rate exceeds a first throttling threshold, then dropping a predetermined percentage of the queries; and
    if the rate exceeds a second throttling threshold higher than the first throttling threshold, then dropping all queries until the rate falls to a predetermined level.

3. The method of claim 1, further comprising the following performed at the domain name system server:
    receiving the domain name system queries from the domain name system load balancer;
    resolving the address of the target network edge device; and
    transmitting through the domain name system load balancer to the user edge device responses to the domain name system queries.

4. The method of claim 3, wherein the responses include an Internet protocol address of the target network edge device.

5. The method of claim 1, further comprising deriving the second threshold rate for the target network edge device from at least one of the following parameters:
- a number of user endpoint devices associated with the target network edge device;
- a historic arrival rate of initial domain name system queries from user endpoint devices; and
- a maximum arrival rate capacity of the target network edge device.

6. The method of claim 1, wherein the registering in the next generation network further comprises registering for a voice over Internet protocol service.

7. The method of claim 1, further comprising:
- at the domain name system load balancer, monitoring a second rate of domain name system queries for resolving a second domain name of a second particular target network edge device in the next generation network;
- receiving from second user endpoint devices a second flow of domain name system queries, each query of the second flow being for resolving the domain name of the second particular target network edge device for use in registering in the next generation network;
- throttling the flow of second domain name system queries differently than the flow of first domain name system queries based on relative rates of the first and second domain name system queries.

8. A method for registering user endpoint devices via a network edge device in a next generation network, the method comprising:
- at a domain name system load balancer, protecting a domain name system server by limiting to a first threshold rate an overall query rate of domain name system queries sent to the domain name system server;
- at the domain name system load balancer, monitoring a rate of domain name system queries for resolving a domain name of a particular target network edge device in the next generation network;
- receiving from the user endpoint devices a flow of domain name system queries, each query of the flow being for resolving the domain name of the same particular target network edge device for use in registering in the next generation network;
- determining a class of service for each user endpoint device of the flow; and
- if the rate of domain name system queries is above a second threshold rate for the target network edge device, the second threshold rate being lower thant the first threshold rate, then throttling a portion of the flow comprising only those domain name system queries from user endpoint devices having a class of service below a predetermined class of service.

9. The method of claim 8, wherein the class of service is determined using an Internet protocol address of the user endpoint device included in the domain name system query.

10. The method of claim 8, wherein throttling comprises:
- if the rate exceeds a first throttling threshold, then dropping a predetermined percentage of the queries having the class of service below the predetermined class of service; and
- if the rate exceeds a second throttling threshold higher than the first throttling threshold, then dropping all queries having the class of service below the predetermined class of service until the rate falls to a predetermined level.

11. The method of claim 8, wherein throttling comprises:
- if the rate of domain name system queries exceeds a predetermined portion of a capacity of the target network edge device, then dropping domain name system queries from user endpoint devices having a low class of service; and
- if the rate of domain name system queries exceeds the capacity of the target network edge device, then dropping all domain name system queries.

12. The method of claim 11, wherein the predetermined portion is 80%.

13. The method of claim 8, further comprising deriving the second threshold rate for the target network edge device from at least one of the following parameters:
- a number of user endpoint devices associated with the target network edge device;
- a historic arrival rate of initial domain name system queries from user endpoint devices; and
- a maximum arrival rate capacity of the target network edge device.

14. The method of claim 8, wherein the registering in the next generation network comprises registering for a voice over Internet protocol service.

15. A non-transitory computer-usable medium having computer readable instructions stored thereon for execution by a processor to perform a method for registering user endpoint devices via a network edge device in a next generation network, the method comprising:
- at a domain name system load balancer, protecting a domain name system server by limiting to a first threshold rate an overall query rate of domain name system queries sent to the domain name system server;
- at the domain name system load balancer, monitoring a rate of domain name system queries for resolving a domain name of a particular target network edge device in the next generation network;
- receiving from the user endpoint devices a flow of domain name system queries, each query of the flow being for resolving the domain name of the same particular target network edge device for use in registering in the next generation network;
- if the rate of domain name system queries for resolving the domain name of the particular target network edge device is below a second threshold rate lower than the first threshold rate, then forwarding the flow of domain name system queries to the domain name system server;
- if the rate of domain name system queries is above the second threshold rate for the target network edge device, then throttling the flow of domain name system queries.

16. The non-transitory computer-usable medium of claim 15, wherein throttling the flow of domain name system queries comprises:
- if the rate exceeds a first throttling threshold, then dropping a predetermined percentage of the queries; and
- if the rate exceeds a second throttling threshold higher than the first throttling threshold, then dropping all queries until the rate falls to a predetermined level.

17. The non-transitory computer-usable medium of claim 15, wherein the method further comprises the following performed at the domain name system server:
- receiving the domain name system queries from the domain name system load balancer;
- resolving the address of the target network edge device; and
- transmitting through the domain name system load balancer to the user edge device responses to the domain name system queries.

18. The computer-usable medium of claim 17, wherein the responses include an Internet protocol address of the target network edge device.

19. The non-transitory computer-usable medium of claim 15, wherein the method further comprises deriving the second threshold rate for the target network edge device from at least one of the following parameters:
- a number of user endpoint devices associated with the target network edge device;
- a historic arrival rate of initial domain name system queries from user endpoint devices; and
- a maximum arrival rate capacity of the target network edge device.

20. The non-transitory computer-usable medium of claim 15, wherein the registering in the NG includes registering for a voice over Internet protocol service.

21. The non-transitory computer-usable medium of claim 15, wherein the method further comprises:
- at the domain name system load balancer, monitoring a second rate of domain name system queries for resolving a second domain name of a second particular target network edge device in the next generation network;
- receiving from second user endpoint devices a second flow of domain name system queries, each query of the second flow being for resolving the domain name of the second particular target network edge device for use in registering in the next generation network;
- throttling the flow of second domain name system queries differently than the flow of first domain name system queries based on relative rates of the first and second domain name system queries.

* * * * *